(12) United States Patent
Yamamoto et al.

(10) Patent No.: US 6,897,268 B2
(45) Date of Patent: May 24, 2005

(54) FLUIDIZED BED POLYMERIZATION APPARATUS AND AN OLEFIN POLYMERIZATION PROCESS

(75) Inventors: Ryouichi Yamamoto, Ichihara (JP); Satoru Ohtani, Ichihara (JP); Tomohiro Arase, Ichihara (JP); Fumio Hattori, Ichihara (JP); Yoshiaki Kikuchi, Ichihara (JP); Hisayoshi Watanabe, Sodegaura (JP); Jun Iwama, Sodegaura (JP)

(73) Assignee: Mitsui Chemical, Inc., Tokyo (JP)

( * ) Notice: Subject to any disclaimer, the term of this patent is extended or adjusted under 35 U.S.C. 154(b) by 572 days.

(21) Appl. No.: 10/252,566

(22) Filed: Sep. 24, 2002

(65) Prior Publication Data

US 2003/0027949 A1 Feb. 6, 2003

Related U.S. Application Data

(62) Division of application No. 09/165,365, filed on Oct. 2, 1998, now Pat. No. 6,461,573.

(30) Foreign Application Priority Data

Oct. 3, 1997 (JP) .............................................. 9/271786
Oct. 3, 1997 (JP) .............................................. 9/271787

(51) Int. Cl.⁷ .................................................. C08F 2/34
(52) U.S. Cl. ............................ 526/61; 526/67; 526/68; 526/901
(58) Field of Search .............................. 526/61, 67, 68, 526/901

(56) References Cited

U.S. PATENT DOCUMENTS

| 3,259,614 A | 7/1966 | Pollock |
| 3,275,809 A | 9/1966 | Tolin et al. |
| 3,718,757 A | 2/1973 | Guiltz et al. |
| 3,933,044 A | 1/1976 | Loper et al. |
| 3,938,386 A | 2/1976 | Comfort et al. |
| 4,333,803 A | 6/1982 | Seger et al. |
| 4,339,410 A | 7/1982 | Satou |
| 4,384,793 A | 5/1983 | O'Brien |
| 4,440,509 A | 4/1984 | Agarwal |
| 4,488,239 A | 12/1984 | Agarwal |
| 4,685,938 A | 8/1987 | Oliker |
| 5,242,999 A | 9/1993 | Takakarhu et al. |
| 5,356,220 A | 10/1994 | Iida et al. |
| 5,428,118 A | 6/1995 | Painter |
| 5,821,861 A | 10/1998 | Hartog et al. |

FOREIGN PATENT DOCUMENTS

EP 0690659 A2 1/1996

Primary Examiner—Fred Teskin
(74) Attorney, Agent, or Firm—Birch, Stewart, Kolasch & Birch, LLP

(57) ABSTRACT

In a gas phase olefin polymerization process using a fluidized bed vessel, an apparatus is employed having a device for measuring temperature or temperature distribution on the external wall surface of the vessel and a controlling means which predicts the progressive state of reaction inside the vessel, calculates the difference between the measured value and a target value determined beforehand and modifies polymerization conditions in relation thereto.

7 Claims, 11 Drawing Sheets

FLUIDIZED BED POLYMERIZATION APPARATUS AND AN OLEFIN POLYMERIZATION PROCESS

This application is a divisional of application Ser. No. 09/165,365, filed on Oct. 2, 1998 now U.S. Pat. No. 6,461,573, the entire contents of which are hereby incorporated by reference and for which priority is claimed under 35 U.S.C. § 120; and this application claims priority of Application No. 9-271786 and 9-271787 filed in Japan on Oct. 3, 1997 under 35 U.S.C. § 119.

BACKGROUND OF THE INVENTION

1. Field of the Invention

This invention relates to a fluidized bed polymerization apparatus and an olefin polymerization process by using this apparatus, more especially, to a fluidized bed polymerization apparatus, with which an olefin polymer can be produced continuously for a long period of time, stably and reasonably, and an olefin polymerization process by using this apparatus.

The term "polymerization" used in this specification means polymerization including homopolymerization and copolymerization; "polymer", polymer including homopolymer and copolymer.

2. Description of the Background

Olefin polymers are represented by polyethylene, polypropylene, and linear low density polyethylene, which is a copolymer of ethylene and α-olefin, and the like. These olefin polymers are widely used for film-forming material and the like.

Such olefin polymers can be produced by using a Ziegler-Natta catalyst or a metallocene catalyst. In recent years, properties of transition-metal compound ingredients contained in this catalyst have been improved. As a result, an olefin-polymerization activity per unit weight of a transition metal has been greatly increased. Consequently, operation of removing catalysts after polymerization reaction can be excluded. On this account, cases adopting a gas phase polymerization, in which polymerization operation is easy, by using this highly active catalyst has been increased.

In the conventional gas phase polymerization, such a fluidized bed gas phase polymerization vessel (reactor) equipped with a gas-dispersing plate as shown in FIG. 12 has been much used. In the gas phase polymerization with use of this polymerization vessel, olefin or olefin-containing gas is introduced through an introducing pipe 72 into the bottom 70a of the polymerization vessel by using a compressor or a blower 73. Then, the above gas is uniformly dispersed through the gas-dispersing plate 79, risen up in the polymerization vessel and brought into contact with catalytic particles in a fluidized bed region 70b located on the upper side of the gas-dispersing plate 79. Consequently, polymerization reaction is progressed in a fluid state.

In this case, an olefin polymer is formed on each surface of the catalytic particles. Accordingly, solid particles each composed of the catalytic particle and olefin polymer are floated in the fluidized bed region 70b. And the polymer particles can be discharged outside out of a discharging line 75 to be recovered. On the other hand, olefin polymer particles polymerized in the fluidized bed region 70b tends to be scattered into the upper part of the fluidized region 70b. In order to prevent the particles from scattering, a reduction region 70c through a gas-circulating pipe 76 with large cross section is provided in the upper part of the fluidized bed polymerization vessel 70 for reducing a gas flow speed. Unreacted or unpolymerized gas is discharged from the top of the reduction region 70c, cooled by using a heat exchanger 77 with cooling water, brine or the like, and again, charged into the bottom 70a of the fluidized bed polymerization vessel 70. Thus, the unreacted or unpolymerized gas is reused by circulation.

By the way, when such fluidized bed polymerization reactor 70 as had aforementioned is operated for a long period of time in order to perform continuous gas phase polymerization, there is some case that the following results will be caused.

(1) In case that the dispersion of the solid particles in the fluidized bed region is not uniform, the solid particles will adhere to the inner wall of the fluidized bed polymerization vessel 70. When polymerization reaction is progressed in this state, heat of polymerization cannot be removed sufficiently from the adhered portion. Consequently, temperature will rise locally at this portion.

(2) Olefin polymer particles will weld together to grow up into mass or sheet polymers. These grown up particles will be dropped and settled in the bottom of the fluidized bed polymerization vessel 70. Otherwise, these particles stay in the middle part. Consequently, temperatures at these local spots will be lowered.

(3) Moreover, when polymerization reaction is progressed promptly within a short period of time, the inner temperature of the polymerization vessel 70 will rise quickly to make progress of polymerization at abnormal speed. Especially, when sudden reaction is locally occurred, hot spots will be generated. This will produce new sheet or mass polymers, thereby operation of the polymerization reactor 70 become unstable.

As for a monitoring means of these occurrence, as shown in FIG. 12, in the previous time, two temperature measuring devices 78a and 78b have been put into the fluidized bed region 70b of the fluidized bed polymerization vessel 70. Further, one temperature measuring device 78c has been put into the reduction region 70c. By these temperature measuring devices the inner temperatures of the fluidized bed polymerization vessel 70 have been checked. In other words, when something unusual in the temperatures, measured by these temperature measuring devices 78a, 78b and 78c such as unusual temperature rise, drop and the like, had been observed, operational conditions of the fluidized bed polymerization reactor 70 was changed for stabilizing polymerization state.

However, when the temperature measuring devices 78a, 78b and 78c are located inside the fluidized polymerization vessel 70 by insertion for measuring the inner temperature thereof, the projected portion of a thermometer in the temperature measuring devices 78a, 78b and 78c will work as obstacle to convection of gas. Further, polymer particles will be adhered to and grown up on the temperature measuring devices 78a, 78b and 78c. Consequently, these polymer particles will be changed into sources of generating sheet or mass polymers. This will cause bad dispersion of the solid particles.

Namely, when many of the temperature measuring devices are arranged inside the fluidized bed polymerization vessel 70, this arrangement will invite residence of the solid particles around the temperature measuring device and lack of heat release, even though the solid particles in the fluidized bed region 70b are made to flow uniformly by dispersing uniformly fluid gas run into the gas introducing region 70a through the gas dispersing plate 79.

Consequently, the solid particles will be adhered in a mass state to the inner wall of the fluidized bed polymerization vessel and the ratio of olefin particles welding together will increase.

Accordingly, such arrangement of the temperature measuring devices as had mentioned above, although it is indispensable to operation of the fluidized bed polymerization vessel, is inclined to cause non-uniform dispersion of the flowing solid particles, and also to cause instability of the fluidized bed. On this account, it is required to minimize the number of temperature measuring devices installed inside the polymerization vessel, especially, inside the fluidized bed.

However, the solid particles composed of catalytic particles and olefin polymer are floated in the fluidized bed region 70b so that the floated solid particles has their own distribution of temperatures, and positions at which heat spots appear are not fixed as well as their distribution is always changed. For that reason, it is very difficult to detect accurately the inner temperatures of the fluidized bed polymerization vessel 70. It is also very difficult to control exactly operational conditions of the fluidized bed polymerization vessel 70 based on this measurement.

As had mentioned above, the conventional temperature measuring method has disadvantages in that it is hard to detect speedily and exactly times and positions of heat spots occurring. Accordingly, it has been hitherto difficult to operate the fluidized bed polymerization vessel stably for a long period of time in succession.

SUMMARY OF THE INVENTION

Accordingly, the first object of the invention is to provide a fluidized bed polymerization apparatus for capable of arranging temperature measuring devices correspondingly to positions where heat spots appear without adhering polymer particles to each of the temperature measuring devices.

The second object of the present invention is to provide a fluidized bed polymerization apparatus in which a temperature measuring device capable of measuring the temperature of a polymerization vessel easily, for example on real time.

The third object of the present invention is to provide a fluidized bed polymerization apparatus capable of determining the state of polymerization progressing inside the polymerization vessel based on the measurement of the temperature measuring device, changing operational conditions and performing stable gas phase polymerization of olefin for a long period of time.

The forth object of the present invention is to provide an olefin polymerization process in a gas phase stably for a long period of time by using the fluidized bed polymerization apparatus.

Other objects, feature and advantages of the invention will become apparent from the following description of embodiments with reference to the accompanying drawings.

Namely, the present invention is related to a fluidized bed polymerization apparatus comprising:

(a) a fluidized bed polymerization vessel having a fluidized bed for polymerizing olefin as solid catalytic ingredient and polymer are fluidized by introducing olefin-containing fluid gas;

(b) a gas-circulating equipment for returning unreacted olefin-containing gas, which is streaming out from the top of the fluidized bed polymerization vessel, to the same polymerization vessel as well as controlling a circulating speed of the unreacted olefin-containing gas;

(c) a raw-material-feeding equipment for feeding fresh olefin to the fluidized bed polymerization vessel as well as controlling the feed of olefin;

(d) a catalyst-feeding equipment for feeding the solid catalyst into the fluidized bed polymerization vessel as well as controlling the feed of the catalyst;

(e) a temperature measuring device for measuring temperature or temperature distribution at plural different positions located on the external wall of the fluidized bed polymerization vessel; and (f) a controlling means for controlling polymerization conditions based on the measurement with the temperature measuring device.

According to the present invention, the preferable temperature measuring device is made up of a plurality of temperature detectors. The plurality temperature detectors may be installed on the external wall of the fluidized bed polymerization vessel so as to keep contact with each other, or at roundabout position separating from the external wall to the extent of exerting no influence on a measuring accuracy, or in a cavity formed on the polymerization vessel enough to produce no projection on the inner wall surface of the polymerization vessel and to exert no influence on safety of equipment such as the mechanical strength of the polymerization vessel and the like; and a temperature measuring instrument for measuring the temperature inside the polymerization vessel indirectly through the temperature measuring device. Summing up, the temperature measuring device features to be arranged at a position capable of measuring the temperature inside the polymerization vessel indirectly and separately from the inner wall of the polymerization vessel. The temperature measuring instrument may have constitution capable of being arranged along the external wall of the polymerization vessel while height and direction are changed. This constitution makes it possible for the temperature measuring device to be arranged at positions corresponding to positions where heat spots appear without adhering polymer particles to the temperature measuring device.

As for the thermo-detector, it is preferable to use a thermoelectric thermometer having a thermocouple embedded in the head of a sheath. The head of the thermoelectric thermometer may be arranged and fixed on the external wall of the polymerization vessel while keeping contact with it. As for the fixing method, the following method may be employed: fixing the sheath head on the external wall of the polymerization vessel by welding; providing the external wall of the polymerization vessel with a stand for bolting having a female screw opening and pressing the sheath head on the external wall with the top of a bolt supported by the stand; making a small cavity on the external wall and embedding the sheath head into the cavity; or the like. Relating to fixing the thermo-detector, it is desirable to cover its periphery with thermal insulating material such as glass wool, rock wool and the like. The size of the thermal insulating material can be designed according to the circumstance.

Here, at least one of plural thermo-detectors to be fixed to the external wall of the polymerization vessel is desirably arranged at height of a distance of 0.1 to 1.5 times, preferably, 0.4 to 1.2 times as large as a value equal to the diameter in the fluidized bed region of the polymerization vessel, apart from a gas-dispersing plate upwardly. In case that the diameters of the fluidized bed region differ in accordance with its height, the value is a half of the sum of its maximum and minimum values. From the findings of the present inventors, the above position is the position liable to generate heat spots. Accordingly, it is desirable for ensuring stable operation to monitor the temperature inside the polymerization vessel by locating at least one of the thermo-detectors at the above position.

Another preferable temperature measuring device in the invention may be an infrared temperature measuring device capable of measuring temperature distribution on the external wall of the fluidized bed polymerization vessel. In this case, temperatures on some or all of the surface that the external wall of the fluid polymerization vessel has are measured by the infrared temperature measuring device from at roundabout position of the predetermined distance apart from the external wall of the fluidized bed polymerization vessel. Consequently, the measurement can be expressed by temperature distribution of the external wall. Especially, when the temperature distribution on each given section by partialization of the fluidized bed polymerization vessel's external wall is measured at a position having the predetermined distance apart therefrom, temperature deviation in the polymerization vessel can be found instantly and easily.

By using this infrared temperature measuring device, temperature distribution can be measured of 2 to 40% by measurable area of the fluidized bed region, or the reduction region, or from the bottom to the middle of the fluidized bed region in the fluidized bed polymerization vessel. A driving mechanism of the infrared temperature measuring device can be provided, and temperature distribution can be measured of 2 to 100% by area for measuring of the peripheral surface of the polymerization vessel. A driving apparatus capable of moving the infrared temperature measuring device on a ring guide rail arranged around the polymerization vessel can be provided as a driving mechanism. Further, the infrared temperature measuring device may have an angle-variable means for fixing an angle variably in every direction in measuring as well as a zooming means for enlarging or reducing a measurable area of temperature distribution in the fluidized bed polymerization vessel.

In this invention, a means for controlling polymer conditions based on the above measurement is provided, thereby, stable operation of an polymerization apparatus is possible.

This controlling means can memorize at least one target value of temperature at corresponding measuring position or of temperature distribution, compare the target value with measured temperature or temperature distribution and calculate to change polymerization conditions so as to coincide with or approximate to the target value. Otherwise, there may be employed another method of memorizing a target value of temperature or temperature distribution on one or more of given sections each having the predetermined area for measuring by partialization of the external wall of the fluidized bed polymerization vessel followed by changing polymerization conditions in the same procedure as had aforementioned. This comparing-calculating steps may be performed by manual operation or automated operation. Especially, the latter case is preferable, since quick control is possible by storing the target value into the memory of a computing machine. The target value may be one value or values having range.

Change of polymerization conditions may be performed by a controlling process including: changing the supply of olefin charging into the fluidized bed polymerization vessel as well as the circulating speed of unreacted olefin-containing gas; changing the supply of the solid catalyst; changing the composition or the linear speed of flowing gas inside the polymerization vessel; changing the discharge amount of the olefin polymer from vessel so as to control the height of the fluidized bed in the vessel; or the like. An opening for supplying deactivated amount of catalytic ingredients may be provided through the fluidized bed polymerization vessel to control catalytic ingredients by supplying the deactivated amount thereof.

The present invention is also related to an olefin polymerization process by using a fluidized bed polymerization apparatus for comprising (a) a fluidized bed polymerization vessel having a fluidized bed for polymerizing olefin as solid catalytic ingredient and polymer are fluidized by introducing olefin-containing gas for flowing, (b) a gas-circulating equipment for returning unreacted olefin-containing gas, which is streaming out from the top of the fluidized bed polymerization vessel, to the same polymerization vessel as well as controlling a circulating speed of the unreacted olefin-containing gas, (c) a raw-material-feeding equipment for feeding fresh olefin to the fluidized bed polymerization vessel as well as controlling the feed of olefin, (d) a catalyst-feeding equipment for feeding the solid catalyst into the fluidized bed polymerization vessel as well as controlling the feed of the catalyst, and comprising the steps of:

measuring temperature or temperature distribution at plural of different positions on the external wall surface of the fluidized bed polymerization vessel;

comparing the measured value with a target value of temperature or temperature distribution set beforehand correspondingly to one or more of measuring positions; and changing polymerization conditions so as for the measured value to coincide with or approximate to the target value.

DETAILED DESCRIPTION OF THE INVENTION

A fluidized bed polymerization apparatus of the present invention is comprised of fluidized bed polymerization vessel, catalyst-feeding equipment, gas circulating equipment, raw-material-feeding equipment, temperature measuring device, controlling means and optionally deactivated-ingredient-supplying equipment and the like. Details of these will be explained in reference to the accompanying drawings as follows.

Fluidized Bed Polymerization Vessel

Figure 1:
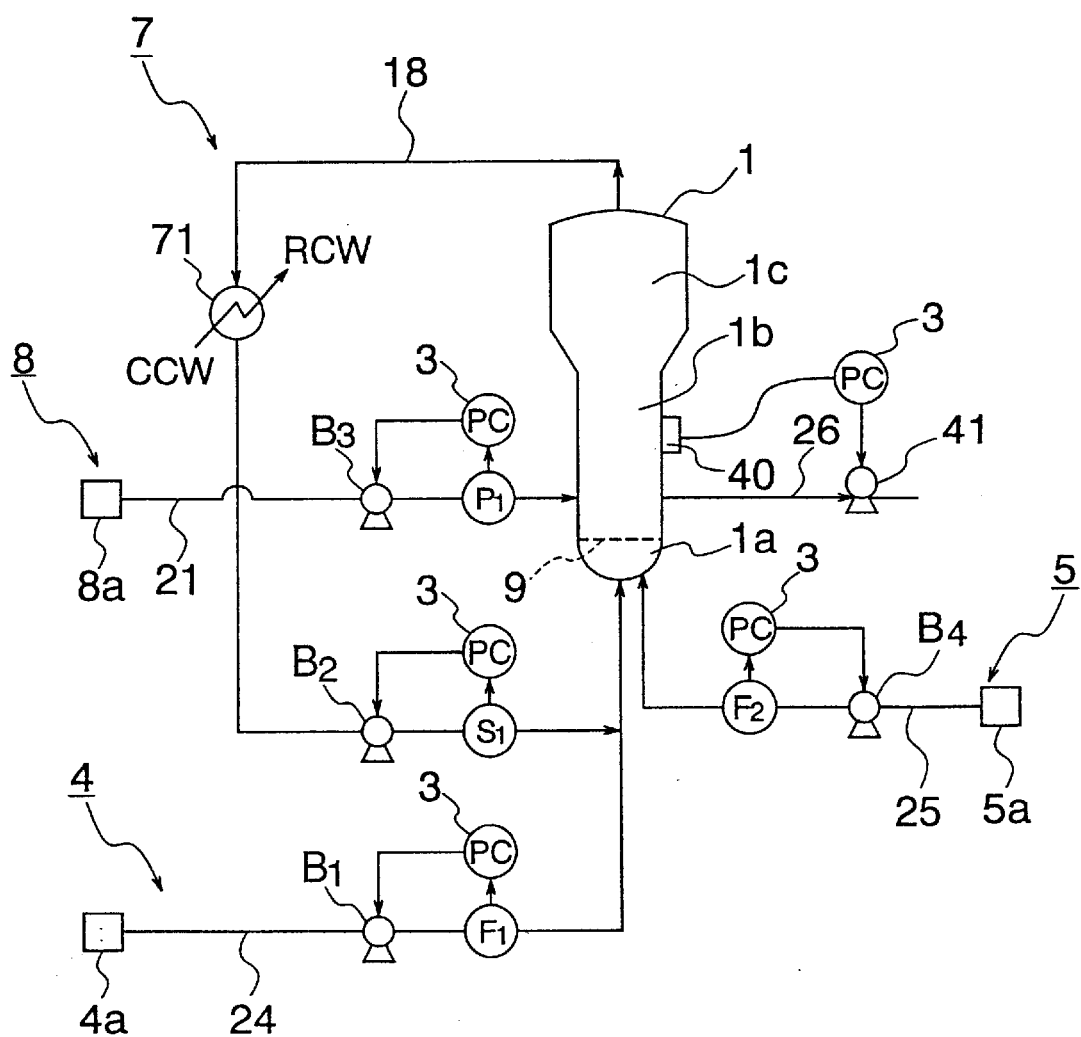
FIG. 1 is a block diagram of fluidized bed polymerization vessel, gas-circulating equipment, raw-material-feeding equipment and catalyst-feeding equipment in the first embodiment of the present invention.

As shown in FIG. 1, this fluidized bed polymerization vessel (hereinafter referred merely as to "polymerization vessel") 1 is a stepped cylindrical tank whose top is large in diameter. In the lower portion in the tank, a gas-dispersing plate 9 is arranged so as to shut the bottom of the tank. The polymerization vessel 1 has a gas-introduction region 1a under the gas dispersing plate 9; a fluidized bed region (polymerization reaction system) 1b, above the gas-dispersing plate 9; and a reduction region 1c, which is a large diameter portion of the tank, in the top of the fluidized bed region 1b. Through the flat face of the gas-dispersing plate 9, many pores are made in order to disperse uniformly olefin gas or olefin-containing gas passing therethrough from the gas-introduction region 1a to the fluidized bed region 1b. In the fluidized bed region 1b, many type of stirrer such as anchor-shaped stirrer, screw-shaped stirrer or the like may optionally be used.

To the side tank wall in the fluidized bed region 1b, a feed pipe 21 for feeding solid catalyst and the like is connected from a catalyst-feeding equipment 8, and a discharging pipe 26 for discharging olefin polymers produced in the fluidized bed region 1b outside the tank is also connected. To the top wall (top end) of the polymerization vessel 1, a gas-circulating pipe 18 of a gas-circulating equipment 7 is connected. To the opposite end of the gas-circulating pipe 18, the bottom wall (bottom end) of the polymerization vessel is connected through the intermediary of a feeding pipe 24 which will be explained below.

To the bottom wall of the polymerization vessel 1, a feeding pipe 24 for feeding supplies such as olefin and the like out of a raw-material-feeding equipment 4 is also connected. The feeding pipe 24 for feeding supplies is connected to the opposite end of the gas-circulating pipe 18. To the bottom wall of the polymerization vessel, a supplying pipe 25 for supplying deactivated ingredients including, for example, carbon monoxide from a deactivated-ingredient-supplying equipment is connected.

Catalyst-Feeding Equipment

As shown in FIG. 1, a catalyst-feeding equipment 8 is equipped with a feeding pipe 21 for feeding a solid catalyst 8a; a blower $B_3$ for feeding the solid catalyst by pressure into the polymerization vessel 1 by way of the feeding pipe 21; and a pressure measuring device $P_1$ for measuring influent pressure of the solid catalyst. This catalyst-feeding equipment 8 is not only for feeding the solid catalyst 8a into the polymerization vessel 1 but also for feeding inert gas or inert solvent together with the solid catalyst 8a if necessary, and sometimes for feeding polymerizable raw materials together with the solid catalyst 8a.

Gas-Circulating Equipment

As shown in FIG. 1, This circulating equipment 7 is provided with a gas-circulating pipe 18 for returning unreacted olefin-containing gas (circulating gas) discharged from the top wall of the polymerization vessel 1 to the bottom wall of the polymerization vessel 1 to circulate the gas; a heat exchanger 71 for cooling the circulating gas; a blower $B_2$ for feeding the gas by pressure into the gas-introduction region 1a of the polymerization vessel to circulate the gas; and a flow-meter $S_1$ for measuring a flow rate of the circulating gas. The heat exchanger 71 for cooling and the flow-meter $S_1$ are connected by means of the gas-circulating pipe 18.

Raw-Material-Feeding Equipment

This raw-material-feeding equipment 4 has a blower B, for feeding raw material of olefin 4a by pressure into the gas-introduction region 1a of the polymerization vessel 1 and a flow-meter $F_1$ for measuring a flow rate of olefin. The blower $B_1$ and the flow-meter $F_1$ are connected through the intermediary of the feeding pipe 24.

Deactivated-Ingredient-Supplying Equipment

This deactivated-ingredient-supplying equipment 5 possesses a blower $B_4$ for optionally feeding a deactivated ingredient 5a for supplying by pressure into the gas-introduction region 1a of the polymerization vessel 1 and a flow-meter $F_2$ for measuring a flow rate thereof. The blower $B_4$ and the flow-meter $F_2$ are connected through the supplying pipe 25. As for the deactivated ingredient for supplying, carbon monoxide, carbon dioxide, oxygen, water or the like is usually used.

Polymerization by Using the Fluidized Bed Polymerization Vessel

Polymerization reaction occurring in this polymerization vessel will be explained as follows.

Into the gas-introduction region 1a of the polymerization vessel, gas for circulating is fed from the gas-circulating pipe 18 of the circulating equipment 7. Raw materials of olefin and hydrogen 4a is fed from the feeding pipe 24 of the raw-material-feeding equipment 4. Further, the deactivated ingredient 5a is optionally supplied into the gas-introduction region 1a from the supplying pipe 25 of the deactivated-ingredient-supplying equipment 5. The raw materials and the like fed into the gas-introduction region 1a pass through the pores of the gas-dispersing plate 9 to be uniformly dispersed and then be fed into the fluidized bed region 1b at a flow rate that makes it possible to maintain uniform fluidizing state by the action of the blower $B_2$ included in the circulating equipment 7.

Into the fluidized bed region 1b, the solid catalyst 8a is fed from the feeding pipe 21 of the catalyst-feeding equipment 8. From the catalyst-feeding equipment 8, other catalytic ingredient of organometallic compound and optionally electron donor may be fed together with the solid catalyst.

Then, in the fluidized bed region 1b, olefin-containing gas reacts in a fluidized state by the action of the solid catalyst 8a to produce a polymer. The produced polymer is discharged from the fluidized bed region 1b through the discharging pipe 26 to the outside equipment for next steps.

On the other hand, unreacted olefin-containing gas, that is, olefin-containing gas failed to be polymerized in the fluidized bed region 1b, flows from the fluidized bed region 1b (small diameter portion of the tank) into the large diameter side of the tank, i.e., the reduction region 1c, in which the flow speed of the flowing gas is reduced in inverse proportion to a cross section as compared with the fluidized bed region. Here, reducing the traveling speed of the flowing gas is effective to prevent particulate polymers from scattering into the upper portion of the polymerization vessel 1.

Next, the gas of reduced traveling speed is discharged from the top wall of the polymerization vessel 1 through the gas-circulating pipe 18 into the gas-circulating equipment 7. The circulating gas discharged into the gas-circulating equipment 7 is cooled by the heat exchanger 71 located in the midway of the gas-circulating pipe 18 to remove heat of polymerization. The unreacted olefin-containing gas after removing the heat of polymerization is returned back from the gas-circulating pipe 18 to the blower $B_2$, compressed by the blower $B_2$ and again fed into the gas-introduction region 1*a*. Then, the gas introduced into the gas-introduction region 1*a* streams together with fresh olefin through the gas-dispersing plate into the fluidized bed region 1*b*, reacts while fluidizing to produce a polymer. The produced polymer is discharged from the fluidized bed region 1*b* through the discharging pipe 26 into the outside equipment for next steps.

Temperature Measuring Device (A)

The first embodiment of the temperature measuring device will be explained in reference to FIG. 2 as follows. The temperature measuring device 2 has a thermo-detector 2*a* such as, for example, thermocouple thermometer for directly detecting temperature, and a temperature measuring part 2*b* which informs a controlling portion 3 of temperature detected by the thermo-detector at every measured position.

This thermoelectric thermometer or thermo-detector is arranged on the external wall of the polymerization vessel or the like. Accordingly, the thermoelectric thermometer is not provided in a state projected from the inner wall of the polymerization vessel 1, but is arranged on a position capable of measuring temperature inside the polymerization vessel beyond the inner wall of the polymerization vessel 1. This thermoelectric thermometer is usually located on the external wall of the polymerization vessel so as to keep contact with each other, but may be located at roundabout position separating from the external wall to the extent of exerting no influence on a measuring accuracy, or in a cavity formed on the polymerization vessel 1 enough to produce no projection on the inner wall of the polymerization vessel and to exert no influence on the strength of the polymerization vessel and the like in relation to safety of equipment. The resolving power of the thermoelectric thermometer is sufficient if it is fully enough to maintain safety operation of the polymerization vessel, but usually ranges within ±0.2° C.

Figure 13:
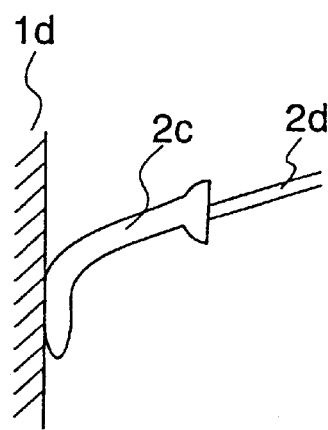
FIGS. 13 to 15 are each side views to illustrate fixing embodiments of the thermo-detector on the external wall of the polymerization vessel.
Figure 14:
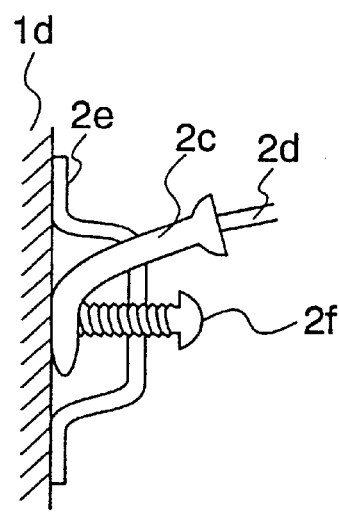
Figure 15:
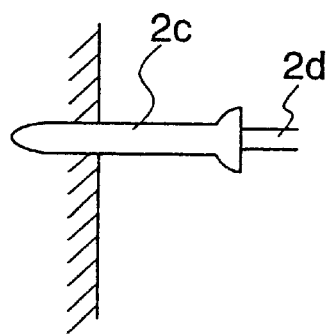

In FIG. 13, a thermocouple 2*d* is embedded in the head of a sheath 2*c*, and the sheath 2*c* is fixed by welding to external wall 1*d* of the polymerization vessel. In FIG. 14, the sheath 2*c* is supported by a stand 2*e* with a bolt 2*f* on the external wall 1*d* of the vessel. In FIG. 15, the sheath head 2*c* is embedded into the cavity on the external wall.

Figure 3:
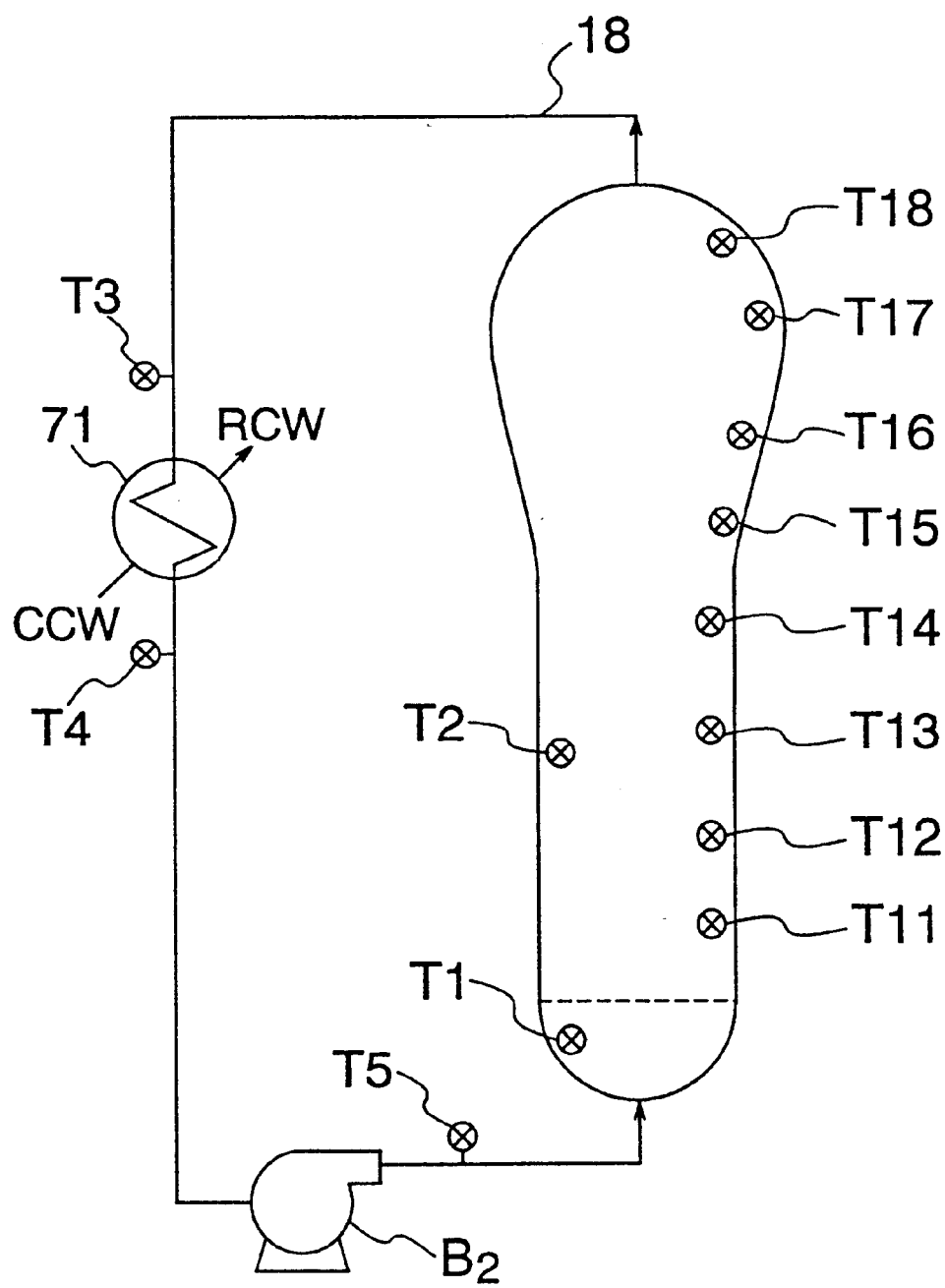
FIG. 3 shows a side view of the arrangement of thermo-detectors installed on fluidized bed polymerization vessel and gas-circulating equipment.

FIG. 3 is a side view showing the arrangement of the thermoelectric thermometers installed in the polymerization vessel 1 and the gas-circulating equipment 7. The thermoelectric thermometers are located on the surface of the polymerization vessel 1 from top to bottom at several height levels of the predetermined interval. In FIG. 3, the thermoelectric thermometer are positioned at eight height levels and located on the external wall of the polymerization vessel 1 in order from the bottom wall at the predetermined intervals of T11 (1-st height level), T12 (2-nd height level) T13 (3-rd height level), T14 (4-th height level), T15 (5-th height level), T16 (6-th height level), T17 (7-th height level) and T18 (8-th height level). At every height level of T11 to T18, four thermoelectric thermometers are arranged on the wall of the polymerization vessel 1 at the same intervals. Other thermoelectric thermometers T1 and T2 than those located at the above height levels may be installed near each of feed and discharge openings on the external wall of the polymerization vessel 1.

The temperature measuring device may also be installed on the gas-circulating equipment 7 other than the external wall of the polymerization vessel 1. In FIG. 3, thermoelectric thermometers T3 and T4 are installed on each periphery of the gas-circulating pipe 18 near the inlet and outlet of the heat exchanger 71. Additionally, a thermoelectric thermometer T5 is installed on the periphery of the gas-circulating pipe 18 between the blower $B_2$ and the feed opening made through the bottom of the polymerization vessel 1.

Figure 4:
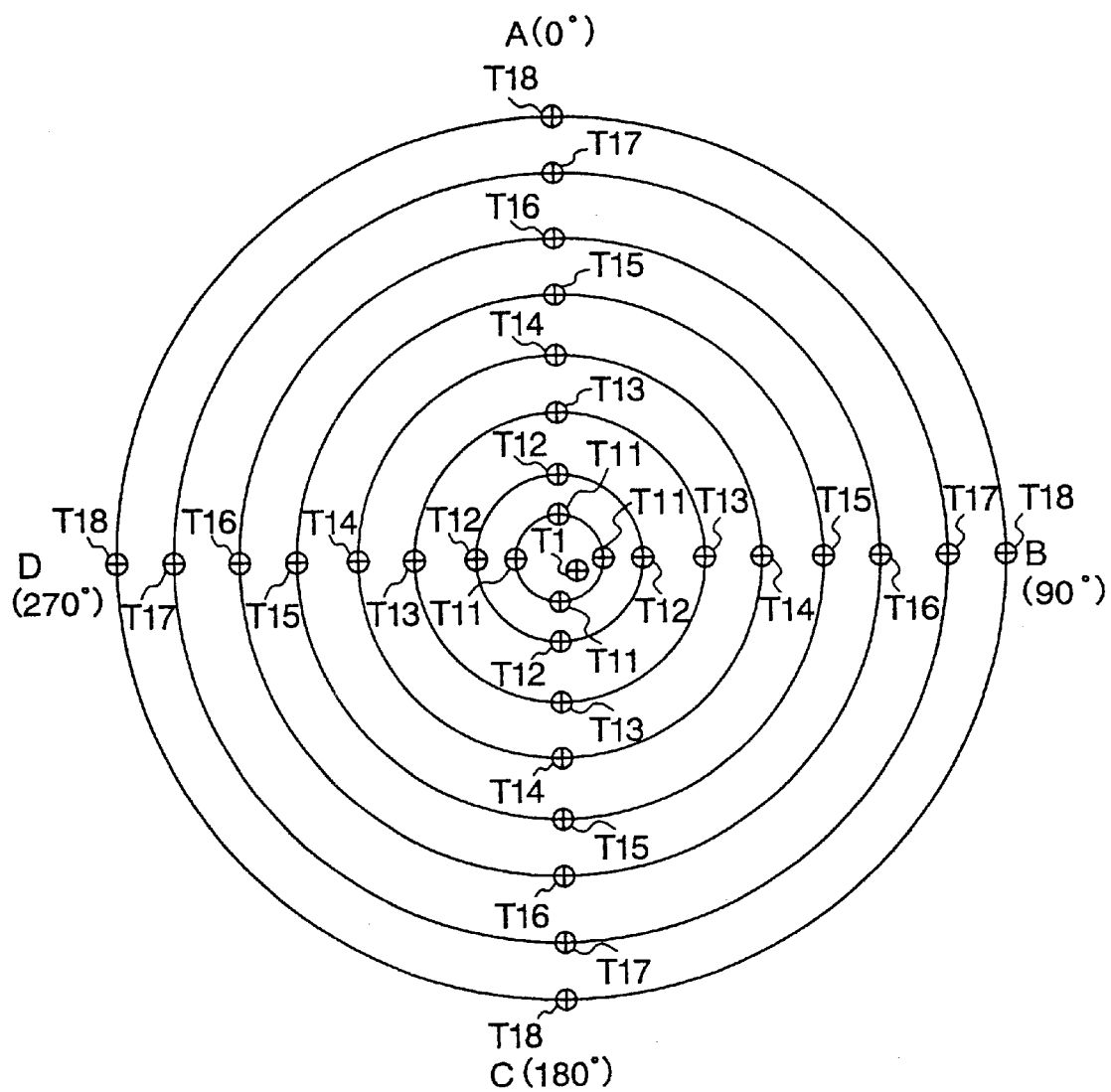
FIG. 4 is a plan of a thermo-detector arranged in a fluidized bed polymerization vessel.

FIG. 4 is a plan of a thermo-detector in the polymerization vessel 1. At every height level of T11 to T18, four thermoelectric thermometers are arranged on the external wall of the polymerization vessel 1 at the same intervals. Namely, four thermoelectric thermometers are located in A direction (0° of direction), B direction (90° of direction), C direction (180° of direction) or D direction (270° of direction), and consequently, they enclose the periphery of the polymerization vessel 1.

Figure 2:
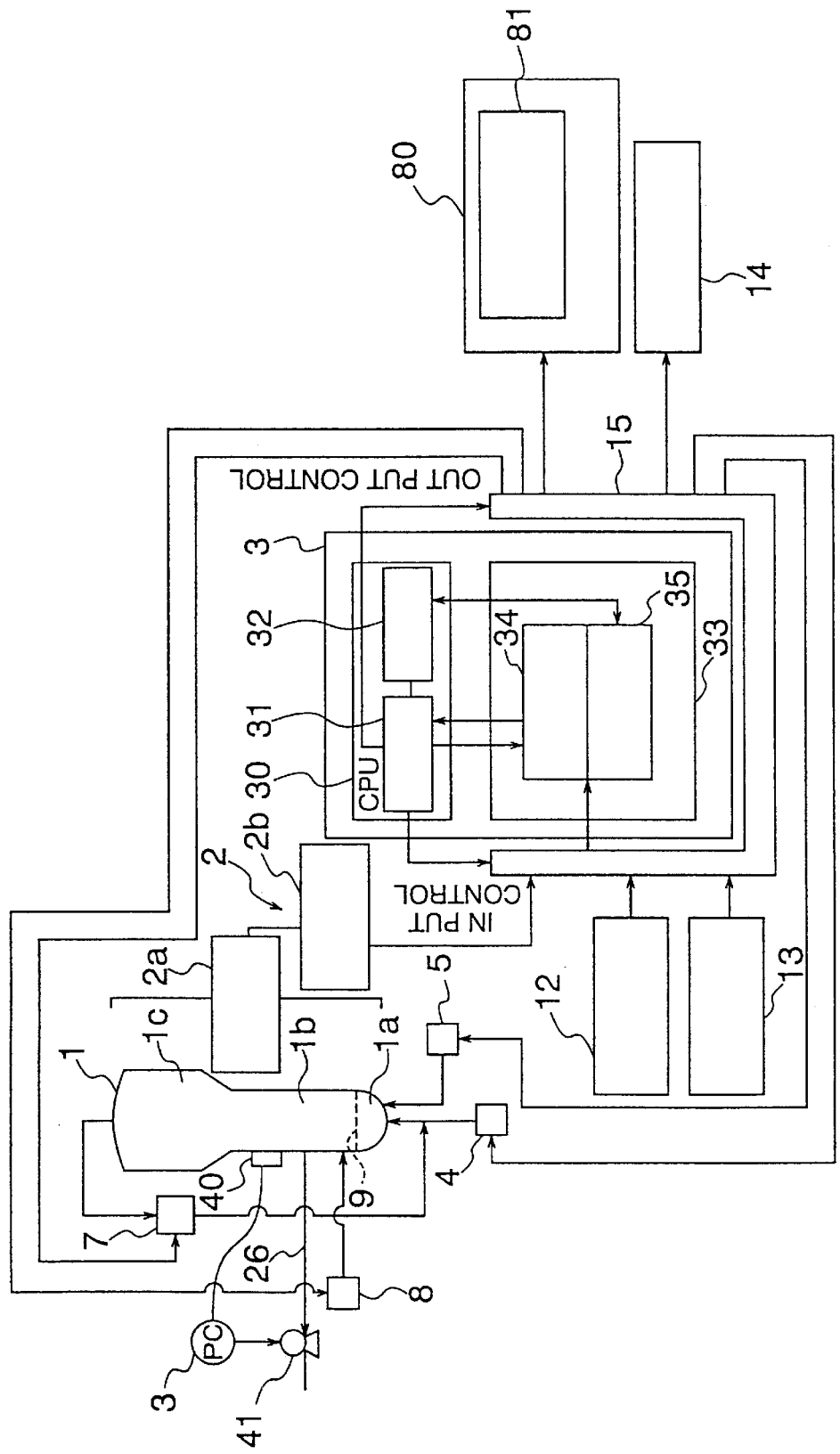
FIG. 2 is a block diagram of an apparatus for fluidized bed polymerization having temperature measuring device and controlling device additionally to the first embodiment of the invention.

As shown in FIG. 2, these thermo-detectors 2*a* may be connected to input/output interface 15 through the temperature measuring part 2*b*. This enables to inform the controlling device 3 independently of temperatures measured by the thermo-detectors 2*a* at every measuring position.

Temperature Measuring Device (B)

The second embodiment of the temperature measuring device will be explained in reference to FIG. 5 as follows. This temperature measuring device is an infrared temperature measuring device for measuring temperature distribution of the external wall of the polymerization vessel 1. The infrared temperature measuring device 200 is to measure temperature distribution of the external wall of the polymerization vessel 1 by detecting the infrared radiation emitted from the same external wall, and usually referred as to "thermo-camera 200". This thermo-camera 200 is to detect the infrared radiation emitted from the polymerization vessel 1 and then to form thermo-image. As for an infrared sensor part, semiconductive materials such as indium-antimony, mercury-cadmium-tellurium or the like are used in the form of a two-dimensional array. The element made of these materials is electrically scanned to obtain thermo-image data. The detectable range of wavelength is different according to the sensing element, typically ranges from 3 to 4.7 $\mu$m, from 8 to 12 $\mu$m or from 8 to 14 $\mu$m, and an appropriate range may be selected depending on needs and others. In case of locating large polymerization vessel and the like outdoors, these are affected by solar radiation. Accordingly, it is preferable to select long wavelength, e.g., 8 to 14 $\mu$m of the sensing element and to cut reflection of solar radiation for more precise temperature measurement.

Figure 6:
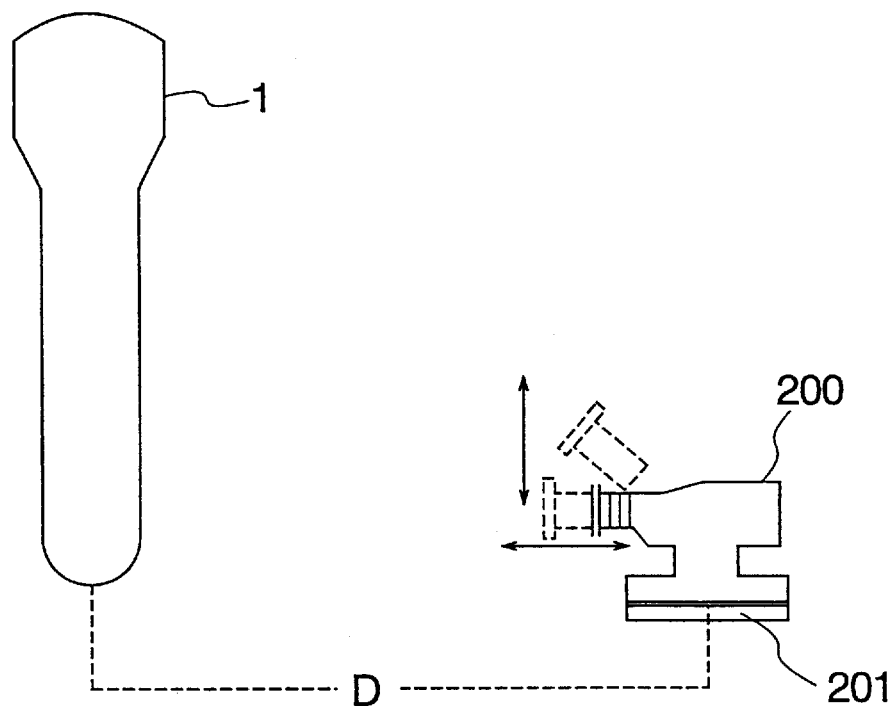
FIG. 6 shows a view of measuring action of an infrared temperature measuring device for use in the second embodiment of the invention.

The thermo-camera 200 may be equipped with a wide-angle lens for measuring the external wall of the polymerization vessel 1 at wide angle as shown in FIG. 6; zoom means such as telephoto lens, lens for widening field of view or the like for measuring the external wall in a zoomed out state. Further, the thermo-camera 200 may have an angle-variable means for fixing a picture angle variably in every direction in measuring. In this way, by using the thermo-camera 200, temperature distribution can be measured of 2 to 40% by area for measuring of a fluidized bed region 1*b*, or a reduction region, or from the bottom to the middle of the fluidized bed region in the polymerization vessel 1.

Figure 7:
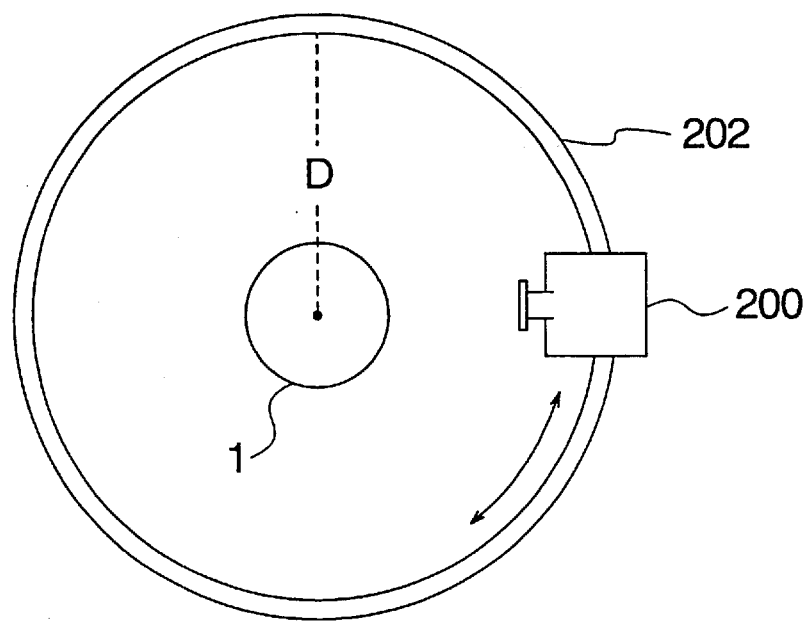
FIG. 7 shows an explanatory view of measuring action of an infrared temperature measuring device.

For measuring temperature distribution of all the peripheral wall of the polymerization vessel 1, as shown in FIG. 7, it may be possible to provide a ring guide rail 202 around the polymerization vessel 1, to mount the thermo-camera 200 on the guide rail 202, and to provide a driving mechanism 201 such as motor or the like for the thermo-camera 200 to travel on the guide rail 202. In case that the thermo-camera can travel on the guide rail 202 in such way, the thermo-camera can measure 2 to 100% by measurable area of temperature distribution. Mounting plural thermo-cameras 200 on the guide rail 202, though it is not shown in any figure of the accompanying drawings, will be possible to measure temperature distribution of all the external wall of the polymerization vessel 1 all along.

Controlling Device (A)

As an embodiment of automated controlling means, an example of employing a personal computer (PC) as a controlling device 3 is shown in FIG. 2. The controlling device PC 3 is connected to the temperature measuring device 2, the gas-circulating equipment 7, the raw-material-feeding equipment 4, the deactivated-catalytic-ingredient-supplying equipment 5 and the catalyst-feeding equipment 8 through the intermediary of input/output interface 15. The PC 3 is also connected to display unit 80, input equipment 12, auxiliary memory 13 and printer 14 as a printing device. The input equipment 12 includes keyboard, OCR, OMR, bar-code reader, digitizer, image scanner, voice recognition unit and the like. The auxiliary memory 13 includes CD-ROM, MO, FD and the like. The controlling device 3 may be replaced by DCS (Distributed Control System).

The PC 3 has CPU 30 and memory 33. The CPU 30 has operational unit 32 and controlling unit 31. The operational unit 32 is for performing arithmetic, logical and other operation of given data. The controlling unit 31 is for originating from the address of instruction 34 to be run, inputting the instruction from a memory 33 into CPU 30, reading the contents of the instruction and instructing necessary action of orders to other equipment. The PC 3 starts a program accumulated in the memory 33 or the auxiliary memory 13 under the control of OS and then executes a given task. This PC 3 can execute a multi-task, i.e., execute plural tasks virtually and concurrently. The PC 3 possesses as its part of function the function of a memory-managing unit, that is a function of converting a logic address of the memory 33 for read or write into a physical address which indicates the address of a logic page for actually reading out from the memory 33 or writing to the memory 33.

As shown in FIG. 2, this controlling unit 31 outputs an input-controlling instruction to each instrument of the polymerization vessel 1; a memory-controlling instruction, to the memory 33; and an output-controlling instruction, to the display unit 80 and the like. The command input by each instrument of the polymerization vessel 1 is at first transferred to the memory 33. This memory 33 has instruction part 34 and data part 35, selects data and instruction from the given command, and transfers the selected data and instruction to the controlling unit 31 of the CPU 30.

Next, explanation as to automatic control in using the temperature measuring device (A) will be made as follows. The temperatures, measured by each of the temperature measuring devices 2a located on the polymerization vessel 1 and optionally the gas-circulating equipment 7, are transferred correspondingly to each the measured positions from the temperature measuring part 2b through input/output interface 15 to the memory 33, and stored into the data part 35 correspondingly to each the measured positions. The data part 35 has stored beforehand the target value of temperature or temperature distribution on the external surface required for stable polymerization correspondingly to each plural measuring positions on the polymerization vessel 1. The instruction part 34 outputs the predetermined control signal to each of devices including the polymerization vessel 1 when deviation or erros against the target value of temperature distribution appeared. Here, the predetermined control signal includes: data such as influent pressure value of the solid catalyst charging into each of the devices including the polymerization vessel 1; and instructions of increasing or decreasing the flow rate of the circulating gas or the charging flow rate of the raw materials and the deactivated ingredients.

Controlling Device (B)

The aforementioned controlling device works as well in the same manner as had explained above even when the infrared temperature measuring device was used as a temperature measuring device. As indicated by FIG. 5, the controlling unit 61 in the controlling device of 66 outputs an input-controlling instruction to the thermo-camera 200 and the like; a memory-controlling instruction, to the memory 63; and an output-controlling instruction, to the display unit 80 and the like. The controlling unit 61 is also connected to an operational unit 62 in the CUP 60 and an instruction art 64 in the memory 63. The command input by the thermo-camera 200 and the like is at first transferred to the memory 63. This memory 63 selects data and instruction from a given command, and transfers the selected data and instruction to the controlling unit 61 of the CPU 60. Here, the temperature of the external wall surface of the polymerization vessel 1 is measured by the thermo-camera 200. The measured value is transferred through the input/output interface 15 to the memory 63, and then stored into the data part 65. The data part 65 has stored beforehand shape-model data regarding plural shapes of the polymerization vessel 1 as well as the target value of temperature distribution of the external wall surface for stable polymerization correspondingly to each the shape-model data.

Figure 8:
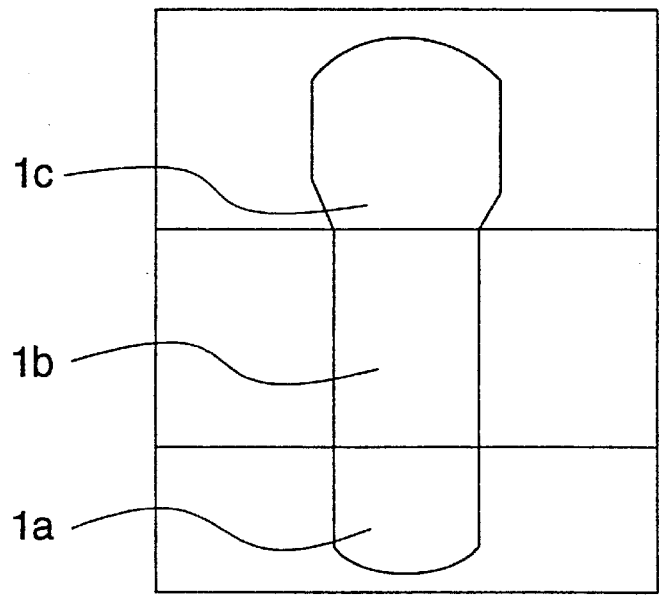
FIG. 8 shows an explanatory view of temperature distribution on the partialized external wall of a fluidized bed polymerization vessel.
Figure 9:
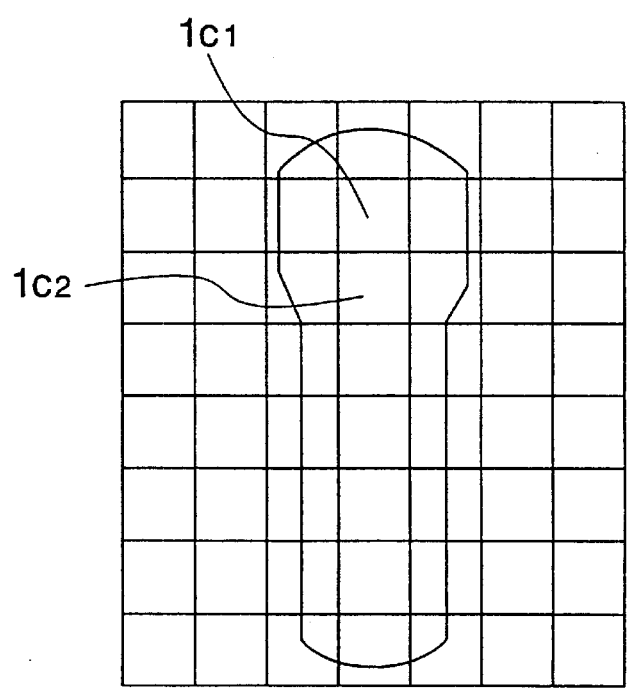
FIG. 9 shows an explanatory view of temperature distribution for use in a fluidized bed polymerization vessel.

This plural shape-model data include the shape-model data corresponding each section of the polymerization vessel 1 partialized at the predetermined intervals, and these partialized shape-model data may be stored into the data part 65. For example, as shown in FIG. 8, the body of the polymerization vessel 1 can be partialized by the gas-dispersing plate 9 into a fluidized bed region 1b and the gas-introduction region 1a. Further, the fluidized bed region is partialized into the fluidized bed region 1b and the reduction region 1c. Consequently, the body of the polymerization vessel 1 can be partialized into three partialized sections in total. These shape-model data corresponding one by one to partialized sections may be stored into the data part 65. The shape-model data (for example, nearly central part 1c1, 1c2 of the reduction region 1c), illustrated in FIG. 9, corresponding to the sections obtained by partializing each of the three sections more finely in the longitudinal direction may also be stored into the data part 65. The external wall surface of the cylindrical polymerization vessel 1 can be partialized into sections small enough to be pictured by the thermo-camera 200 to store the shape-model data corresponding one by one to these sections into the data part.

The PC 66 can store shape-model data corresponding to temperature distribution of the surface of the polymerization vessel 1 measured by the thermo-camera 200 on the guide rail 202 at a distance D apart from the center of the circular bottom of the polymerization vessel 1 as well as shape-model data corresponding to picture angles of the thermo-camera 200 in measuring or shape-model data corresponding to zooming up or down. The guide rail 202 may be not only in a ringed shape but also in an elliptic or rectangular shape provided that objects can be measured within a range of allowable deviation.

Moreover, there can also be stored shape-model data in case of measuring at the predetermined ratio against the surface area of the polymerization vessel 1 or against each surface area of the gas-introduction region 1a, the fluidized bed region 1b and the reduction region 1c.

The PC 66 can record composite picture of visible image (black and white) and thermo-image data (color) on the same screen so that the shape of the external surface of the polymerization vessel 1 can be easily distinguished. The PC 66 may include the memory 63 into which the thermo-image data can be input at high speed (for example, 30 frame per second) on real time and a photomagnetic disc for storing the thermo-image data input into the memory.

Next, an exemplary image processing of the thermo-image pictured by the thermo-camera 200 is shown below. In image processing a thermo-image, shape and temperature distribution of the external wall surface of the polymerization vessel 1 are expressed by pixel images. Image processing of a thermo-image is usually performed by Median cut color quantization in which a palette is selected in accordance with an input image. Here, in the Median cut color quantization, color of a palette is selected in accordance with color distribution of an image. In the palette selected by the Median cut color quantization, each color of the palette is representative of the same number of pixels in an original image. Image processing of a visible image includes the step of substituting a gray image of 256 gradations by a gray image of 16 gradations. Then, the Median cut quantization is adopted to obtain a palette of 16 gradations. After obtaining histogram which represents distribution of gray image gradation, both sides of area in which no image can be observed are cut off in connection with the thus obtained histogram. Median of the remained area after cutting off is determined, and then, the area is divided into two areas on the basis of the median. This method of determining median and dividing the area on the basis of the median is adopted to each area, and the resultant median of each area is selected as a gradation of the palette.

On the other hand, in case of thermo-image data of a color image, color space is, for example, expressed by RGB color spatial coordinates, and the each coordinate axis of RGB is given a gradation number of 0 to 255. Then, all the end portions of the cube containing no pixel are removed off, the remained box is cut into two boxes on the basis of median. Afterwards, vacant ends of the thus obtained two boxes are cut off, and the remained boxes are each cut into two boxes on the basis of long side of median. The same procedure is repeated until 256 of boxes are obtained. In 256 of the thus obtained boxes the same number of pixels are observed, and the concentration of pixels is inversely proportional to the size of the box. The median in each of 256 boxes is selected to be a color of the palette.

The thus selected color is observed by the display unit 80. By the way, color of materials is generally changed depending on a rise of temperature. Namely, as the temperature of a material rises, a color emitted by the material changes from black to blue, green, red, orange, yellow, white or pale color in this order. High temperature portion of the polymerization vessel 1 exhibits colors in the range of from red to pale color; and low temperature portion, colors in the range of from green to black. As such, temperature distribution of the polymerization vessel is distinguished by a color. Consequently, if a value corresponding to temperature has been set beforehand in accordance with these color change, temperature distribution of the external surface of the polymerization vessel 1 can be determined.

Taking the variation of temperature observed in the polymerization vessel 1 and the gas-circulating equipment 7 into consideration to some extent, the target value of temperature or temperature distribution set beforehand may have allowable deviation of, for example, about ±5° C. Though the allowable deviation against the target value of temperature or temperature distribution can be input into the memory 63 at every time that olefin to be polymerized is changed, these allowable deviation may have been stored in the memory 63 beforehand since these value can be determined depending on olefin to be polymerized. The target value may be set and stored into the memory 63 individually of the gas-introduction region 1a, of the fluidized bed region 1b, of the reduction region 1c, or of every finely partialized section of the fluidized bed region 1b and the reduction region 1c.

Control Map

The controlling device PC 3 has stored correlation data of: fluent pressure value of a solid catalyst, flowing speed of a circulating gas and fluent flow rate of olefin (raw material), deactivated ingredient or the like; and wall surface temperature of the polymerization vessel 1 and the gas-circulating equipment beforehand in the form of a map (or control map).

The PC 3 has a learning function of storing values corresponding to temperature or temperature distribution of the external surface of the polymerization vessel and changing correlation data on a control map at every time when increase or decrease is caused concerning one or more of fluent pressure value of the same solid catalyst, flowing speed of the same circulating gas and fluent flow rate of the same olefin (raw material), deactivated ingredient and the like. In other words, the PC 3 rewrites an initial set value to a value corresponding to actual temperature rise when actual temperature rise due to charging circulating gas, olefin, deactivated ingredient, solid catalyst and the like is less than that initially set on the basis of ideal temperature or temperature distribution. By storing this value, control will be made on the bases of this rewritten temperature when charging is performed of one or more of circulating gas, olefin, deactivated ingredient, solid catalyst and the like.

Details of control map regarding each of the above ingredients is below explained.

(1) Catalyst control map indicates the correlation of the fluent pressure value of a catalyst 8a denoted by Y-axis (axis of ordinates) and temperature denoted by X-axis (axis of abscissas) wherein temperature of X-axis increases as Y-axis, the fluent value of the catalyst 8a increases. Accordingly, the control signal output by the PC 3 includes a signal instructing change of the fluent value of the catalyst 8a feeding into the polymerization vessel.

(2) Deactivated ingredient control map indicates the correlation of the supply of a deactivated ingredient denoted by Y-axis (axis of ordinates) and temperature denoted by X-axis (axis of abscissas) wherein temperature of X-axis increases as Y-axis, the supply of the deactivated ingredient increases. Accordingly, the control signal output by the PC 3 includes a signal instructing change of the flow rate value of the deactivated ingredient feeding into the polymerization vessel.

(3) Circulating gas control map indicates the correlation of the flow speed value of circulating gas denoted by Y-axis (axis of ordinates) and temperature denoted by X-axis (axis of abscissas) wherein temperature of X-axis increases as Y-axis, the flow speed value of the circulating gas increases.

(4) Olefin control map indicates the correlation of the feed of olefin denoted by Y-axis (axis of ordinates) and temperature denoted by X-axis (axis of abscissas) wherein temperature of X-axis increases as Y-axis, the feed of olefin increases. Accordingly, the control signal output by the PC3 includes signals instructing change of the flow speed value of the circulating gas and the feed of olefin.

By the way, the linear speed of flowing gas is defined by the volume of blowing gas from the gas-introduction region, that is, the sum of the gas flow of olefin freshly fed (flow rate volume of raw material) and the gas flow fed from the gas-circulating equipment 7 into the polymerization vessel 1 (flow speed volume of circulating gas). Accordingly, after storing the correlation of the linear speed of flowing gas and the external wall temperature of the polymerization vessel in the form of a map beforehand, the correlation on the map may be changed by storing temperature distribution change of the external wall surface of the polymerization vessel 1 at every time when the linear speed of the gas is increased or decreased to change. The PC 3 may have such a learning function as had just mentioned above.

Further, after storing the correlation of the composition of flowing gas and the external wall temperature of the polymerization vessel in the form of a map beforehand, the correlation on the map may be changed by storing temperature distribution change of the external wall of the polymerization vessel at every time when the composition of the flowing gas is changed. The PC 3 may have such a learning function as had just mentioned above. The meaning of "flowing gas composition" includes changing the composition of olefin monomer or comonomer, and changing the composition of flow gas feeding into the polymerization vessel 1. Here, the meaning of "change of flowing gas composition" includes changing the composition of olefin monomer or comonomer, and changing the partial pressure of nitrogen atmosphere. Accordingly, the control signal output by the PC 3 includes a signal instructing change of the composition and linear speed of gas flowing into the polymerization vessel 1. Here, the meaning of "change of flowing gas composition" includes changing the composition of olefin monomer or comonomer, and changing the partial pressure of nitrogen atmosphere.

Display Unit

The display unit 80, which is connected to the controlling device PC 3 through the input/output interface, has a display screen 81, and can-process the side image of the polymerization vessel 1 and the gas circulating equipment, the plan image of the polymerization vessel 1 and the image showing the measured temperature at every measured position on the basis of the PC 3 instruction and detected temperature data. Then, the display unit 80 shows the processed image on the display screen 81.

Figure 5:
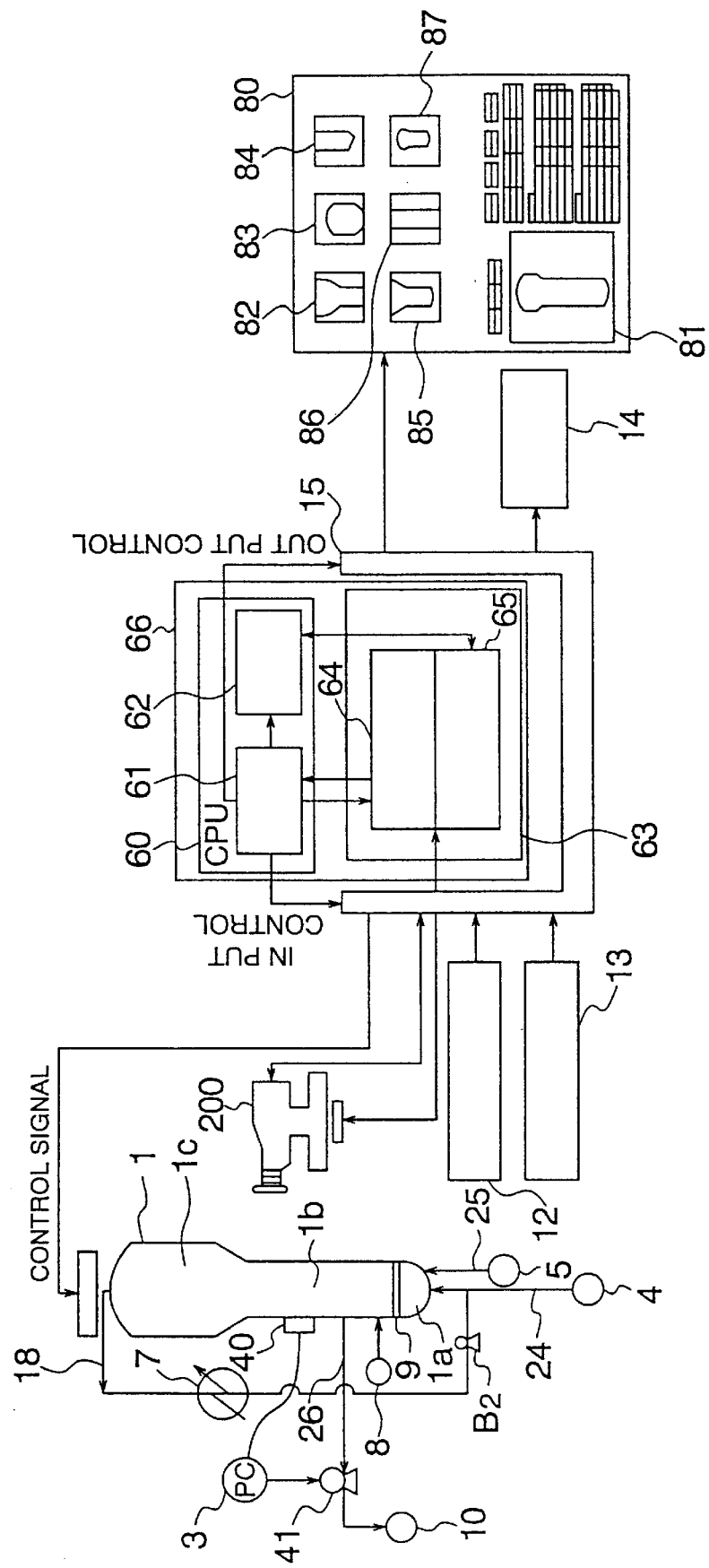
FIG. 5 is a block diagram of an apparatus for fluidized bed polymerization in the second embodiment of the invention.

The display unit 80 has, for example, one main screen 81 for displaying main image data and six sub-screens 82 to 87 for displaying other data as shown in FIG. 5. On the main screen 81, temperature or temperature distribution of the external surface of the polymerization vessel 1 measuring on real time can be shown in color.

The image recorded on the main screen 81 (main image) and the image recorded on any one of the sub-screens 82 to 87 can be exchanged on real time. When the image recorded on one of the sub-screens 82 to 87 (sub-image) is exchanged for the main image, the sub-image is instantly displayed on the main screen 81. Then, comparison with a target value and operation based on this comparison are usually made on the basis of the image displayed on the main screen 81.

Next, into the images displayed on the sub-screens 82 to 87, there can be independently output, for example, image data relating to both of the fluidized bed region 1b and the reduction region 1c, those only relating to the reduction region 1c, those relating to the fluidized bed region 1b and the gas-introduction region 1a, those relating to the fluidized bed region 1b, the gas-introduction region 1a and reduction region 1c, those relating to only body portion of the fluidized bed region 1b, those relating to all the polymerization vessel 1 or the like.

On the main screen 81 and the sub-screen 82 to 87, the external surface temperature of the polymerization vessel 1 or temperature in temperature distribution may be expressed by character. This expression of temperature by character may be, for example, for indicating average temperature, maximum temperature or minimum temperature, for indicating temperature changing ratio per unit time or for indicating temperature of only specific portion of the fluidized bed region 1b and the like.

Polymerization Process Control (A)

Next, Concrete example of process control regarding the polymerization vessel 1 is below explained. In this example, as suggested by FIG. 1, propylene as for olefin is fed into the gas-introduction region 1a of the polymerization vessel 1, and then allowed to be polymerized.

(1) Propylene Feed Control

The influent flow rate value of propylene measured by the flow-meter $F_1$ is input into the PC 3. The PC 3 calculates the difference value between temperature or temperature distribution of the external wall of the polymerization vessel 1 measured by the temperature measuring device 2 and a target value thereof. When this difference value exceeds the range of allowable deviation, changing the output magnitude of the blower B, connected to the PC 3 will be made in accordance with the olefin control map to increase or decrease the influent flow rate value (feed) of the propylene.

(2) Circulating Gas Flow Speed Control

The flow speed value of circulating gas measured by the flow-meter $S_1$ is input into the PC 3. The PC 3 calculates the difference value between temperature or temperature distribution of the external wall of the polymerization vessel 1 and the gas-circulating equipment measured by the temperature measuring device 2 and a target value thereof. When this difference value exceeds the range of allowable deviation, changing the output magnitude of the blower $B_2$ connected to the PC 3 will be made in accordance with the circulating gas control map to increase or decrease the flow speed value of the circulating gas.

(3) Catalyst Feed Control

The influent pressure value of a solid catalyst 8a measured by the pressure measuring device $P_1$ is input into the PC 3. The PC 3 calculates the difference value between temperature distribution of the external wall of the polymerization vessell measured by the temperature measuring device 2 and a target value thereof. When this difference value exceeds the range of allowable deviation, changing the output magnitude of the blower $B_3$ connected to the PC 3 will be made in accordance with the catalyst control map to increase or decrease the influent pressure value of the catalyst 8a.

(4) Polymer Discharge Control

The fluidized bed height measured by measuring device 40 is input into the PC 3. The PC 3 calculates the difference value between temperature distribution of the external wall of the polymerization vessel 1 measured by the temperature measuring device 2 and a target value thereof. When this difference value exceeds the range of allowable deviation, changing the aperture of the valve 41 on the discharging pipe 26, refer to FIGS. 1, 2 and 5, connected to the PC 3 will be made in accordance with the fluidized bed height control map to increase or decrease the aperture of the valve 41, so that the fluidized bed height is changed.

(5) Deactivated Ingredient Supply Control

The influent flow rate value of a deactivated ingredient measured by the flow-meter $F_2$ is input into the PC 3. The PC 3 calculates the difference value between temperature distribution of the external wall of the polymerization vessel 1 measured by the temperature measuring device 2 and a target value thereof. When this difference value exceeds the range of allowable deviation, changing the output magnitude of the blower $B_4$ connected to the PC 3 will be made in accordance with the deactivated ingredient control map to increase or decrease the influent flow rate value (supply) of the deactivated ingredient.

In this embodiment shown in FIG. 1, one influent passage of a deactivated ingredient is provided. However, plural influent passages of the deactivated ingredient may be provided. For example, in order to supply the deactivated ingredient into each of the gas-introduction region 1a, the fluidized bed region 1b and the reduction region 1c, the influent passages may be connected to these regions correspondingly.

In the polymerization apparatus as had explained above, discharge volume, influent pressure and the like are controlled by changing the output magnitude of the blowers $B_1$ to $B_4$. However, these values can be controlled by installing a control valve and changing its opening and shutting degree instead of changing the output magnitude of the blowers $B_1$ to $B_4$.

Polymerization Process Control (B)

Next, concrete example of process control in using the temperature measuring device (B) will be explained below. In the embodiment of the polymerization apparatus according to the invention, as suggested by FIG. 10, ethylene and hydrogen are fed into the gas-introduction region 1a of the polymerization vessel 1 through a blower $B_1$ connected to a feed pipe 24, and then, allowed to be polymerized. In this process, the hydrogen works as a molecular weight modifier for controlling the polymerization degree of the ethylene.

To the feed pipe 24 on the blowout side of the blower $B_1$, a flow-meter $F_1$ is connected for measuring the influent flow rate of ethylene and hydrogen. The feed of ethylene and hydrogen measured by this flow-meter $F_1$ is input into the PC 3 connected to the flow-meter $F_1$ through an input/output interface 15. Here in the PC 3, when difference appears between temperature distribution of the external wall of the polymerization vessel 1 measured by a thermo-camera 200 and a target value thereof, and this difference exceeds the range of allowable deviation, changing the output magnitude of the blower $B_1$ connected to the PC 3 will be made to increase or decrease the feed of ethylene and/or hydrogen.

Then, discharged gas out of a gas-circulating pipe 18 connected to the tank top of the polymerization vessel 1 is cooled by a heat exchanger 71 and heat of polymerization is removed.

The linear speed of the gas is measured by a gas linear speed indicator $S_1$ arranged on blowing side of a blower $B_2$ and input into the PC 3 connected to this gas linear speed indicator $S_1$ through the input/output interface 15. Then, in the PC 3, when difference appears between temperature distribution of the external wall of the polymerization vessel 1 measured by the thermo-camera 200 and a target value thereof, and this difference exceeds the range of allowable deviation, changing the output magnitude of the blower $B_2$ connected to the PC 3 will be made to increase or decrease the circulating speed or linear speed of the gas. Such changing the linear speed of circulating gas and the like accompanies consequentially changing the flow rate of the same.

The polymerization vessel 1 is equipped with first feeder 8a for feeding a catalyst through an introducing pipe se 19 into the fluidized bed region 1b, second feeder 8b for feeding nitrogen gas through an introducing pipe 20 into the fluidized bed region 1b and third feeder 8c for feeding third ingredient through an introducing pipe 22 linked to the first and second feeders.

To the introducing pipe 19, a blower $B_3$ is connected. On the blowing side of this blower $B_3$, flow-meter $F_2$ and flow speed indicator $S_2$ are arranged. Flow rate of a catalyst is measured by the flow-meter $F_2$ and input into the PC 3 connected thereto through the input/output interface 15. Flow speed of a catalyst is measured by the flow speed indicator and input into the PC 3 connected thereto through the input/output interface 15.

In the PC 3, when difference appears between temperature distribution of the external wall of the polymerization vessel measured by the thermo-camera 200 and a target value thereof, and this difference exceeds the range of allowable deviation, changing the output magnitude of the blower $B_3$ connected to the PC 3 will be made to increase or decrease the flow rate and flow speed of the catalyst.

On the other hand, to the introducing pipe 20, a blower $B_4$ is connected. On the blowing side of this blower $B_4$, a pressure measuring device for measuring feed pressure of nitrogen gas are arranged. Then, pressure of nitrogen gas is measured by this pressure measuring device $P_1$ and input into the PC 3 connected thereto through the input/output interface 15. In the PC 3, when difference appears between temperature distribution of the external wall of the polymerization vessel measured by the thermo-camera 200 and a target value thereof, and this difference exceeds the range of allowable deviation, changing the output magnitude of the blower $B_4$ connected to the PC 3 will be made to increase or decrease the feed pressure of the nitrogen gas.

The polymerization vessel 1 further includes third feeder 8c for feeding nitrogen gas through an introducing pipe 22 into the fluidized bed region 1b and fourth feeder 8d for feeding a co-catalyst through an introducing pipe 23 into the fluidized bed region 1b. To the introducing pipe 22, a blower $B_5$ is connected. On the blowing side of this blower $B_5$, a pressure measuring device $P_2$ for measuring feed pressure of nitrogen gas are arranged. Then, pressure of nitrogen gas is measured by this pressure measuring device $P_2$ and input into the PC 3 connected thereto through the input/output interface 15. In the PC 3, when difference appears between temperature distribution of the external wall of the polymerization vessel measured by the thermo-camera 200 and a target value thereof, and this difference exceeds the range of allowable deviation, changing the output magnitude of the blower $B_5$ connected to the PC 3 will be made to increase or decrease the feed pressure of the nitrogen gas.

On the other hand, to the introducing pipe 23, a blower $B_6$ is connected. On the blowing side of this blower $B_6$, flowmeter $F_4$ for measuring flow rate of a co-catalyst is arranged. Flow rate of a co-catalyst is measured by the flowmeter $F_4$ and input into the PC 3 connected thereto through the input/output interface 15. Then, in the PC 3, when difference appears between temperature distribution of the external wall of the polymerization vessel measured by the thermo-camera 200 and a target value thereof, and this difference exceeds the range of allowable deviation, changing the output magnitude of the blower $B_6$ connected to the PC 3 will be made to increase or decrease the flow rate of the co-catalyst.

As such, flowing gas composition to be freshly fed can be changed by changing the influent pressure of nitrogen gas and the influent flow rate of a co-catalyst.

To the gas-introducing region 1a of the polymerization vessel 1 a fifth feeder 5 for supplying a deactivated ingredient is connected through an introducing pipe 25. In the midway of the introducing pipe 25, a blower $B_7$ is provided. On blowing side of the blower $B_7$, a flow-meter $F_3$ for measuring flow rate of the deactivated ingredient is arranged. Flow rate of the deactivated ingredient is measured by the flow-meter $F_3$ and input into the PC 3 connected thereto through the input/output interface 15. Then, in the PC 3, when difference appears between temperature distribution of the external wall of the polymerization vessel measured by the thermo-camera 200 and a target value thereof, and this difference exceeds the range of allowable deviation, changing the output magnitude of the blower $B_7$ connected to the PC 3 will be made to increase or decrease the flow rate of the deactivated ingredient.

Figure 10:
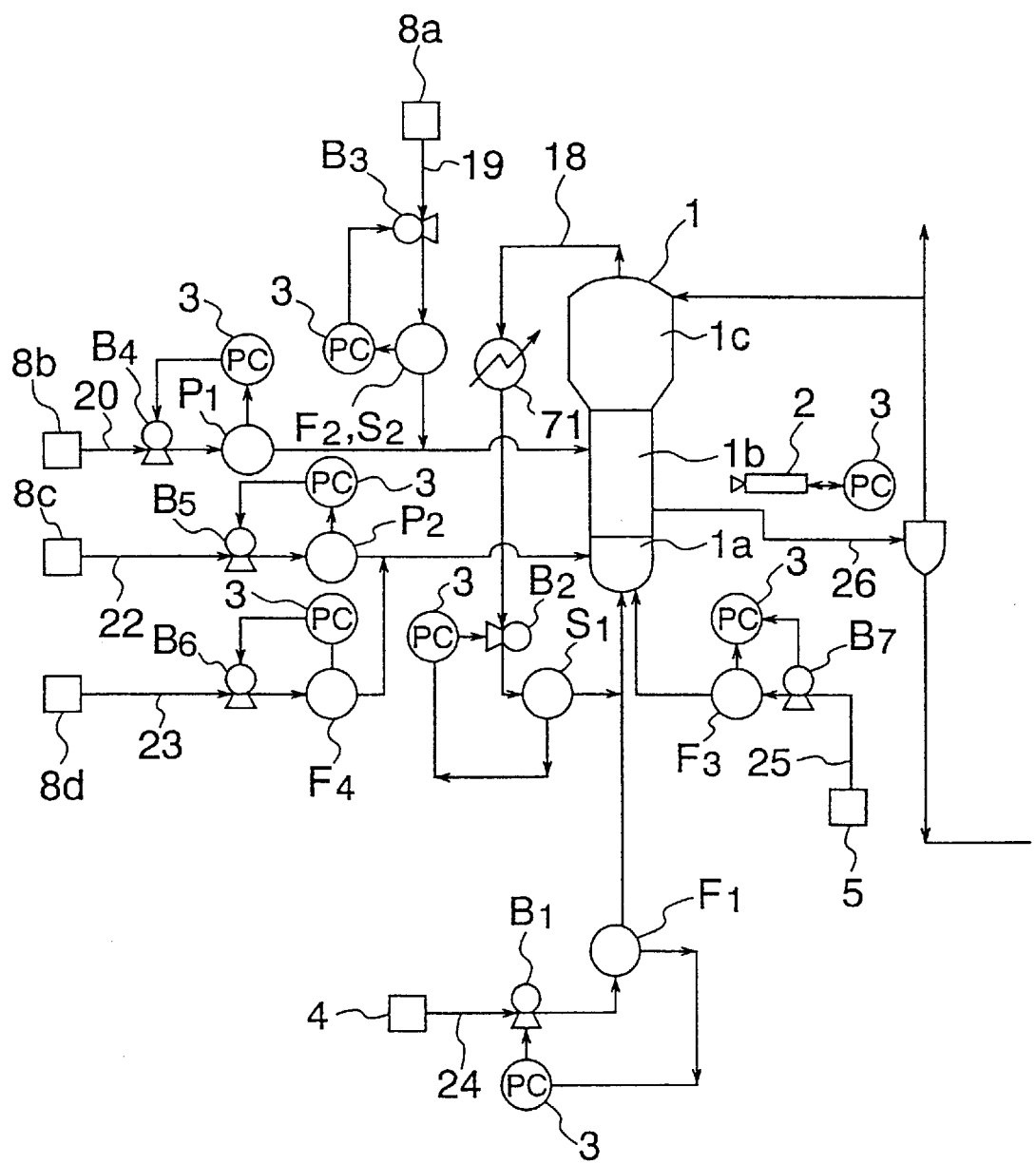
FIG. 10 is a block diagram for controlling an apparatus for fluidized bed polymerization.

In this embodiment shown in FIG. 10, one influent passage of a deactivated ingredient is provided. However, plural influent passages of the deactivated ingredient may be provided. For example, in order to supply the deactivated ingredient into each of the gas-introduction region 1a, the fluidized bed region 1b and the reduction region 1c, the influent passages may be connected to these regions correspondingly.

In the polymerization apparatus for fluidized bed polymerization as shown in FIG. 10, influent volume, influent pressure and the like are controlled by changing the output magnitude of the blowers $B_1$ to $B_7$. However, these values can be controlled by installing a control valve and changing its opening and shutting degree instead of changing the output magnitude of the blowers $B_1$ to $B_7$.

Temperature of the polymerization vessel changes depending on the catalyst to be fed, kind and feed of the co-catalyst to be fed, supply pressure of an inert ingredient, feed and linear speed of discharged gas and the like. The data regarding the change of temperature caused by these factors have been previously stored in the PC 3. Accordingly, feed and the like can be changed on the basis of these stored data.

Further, flow rate and discharge pressure corresponding to power of blower and the like or opening and shutting degree of control valve and the like can be determined by calculation, and these data have been also stored in the PC 3 beforehand.

Control Action Principle

Figure 11:
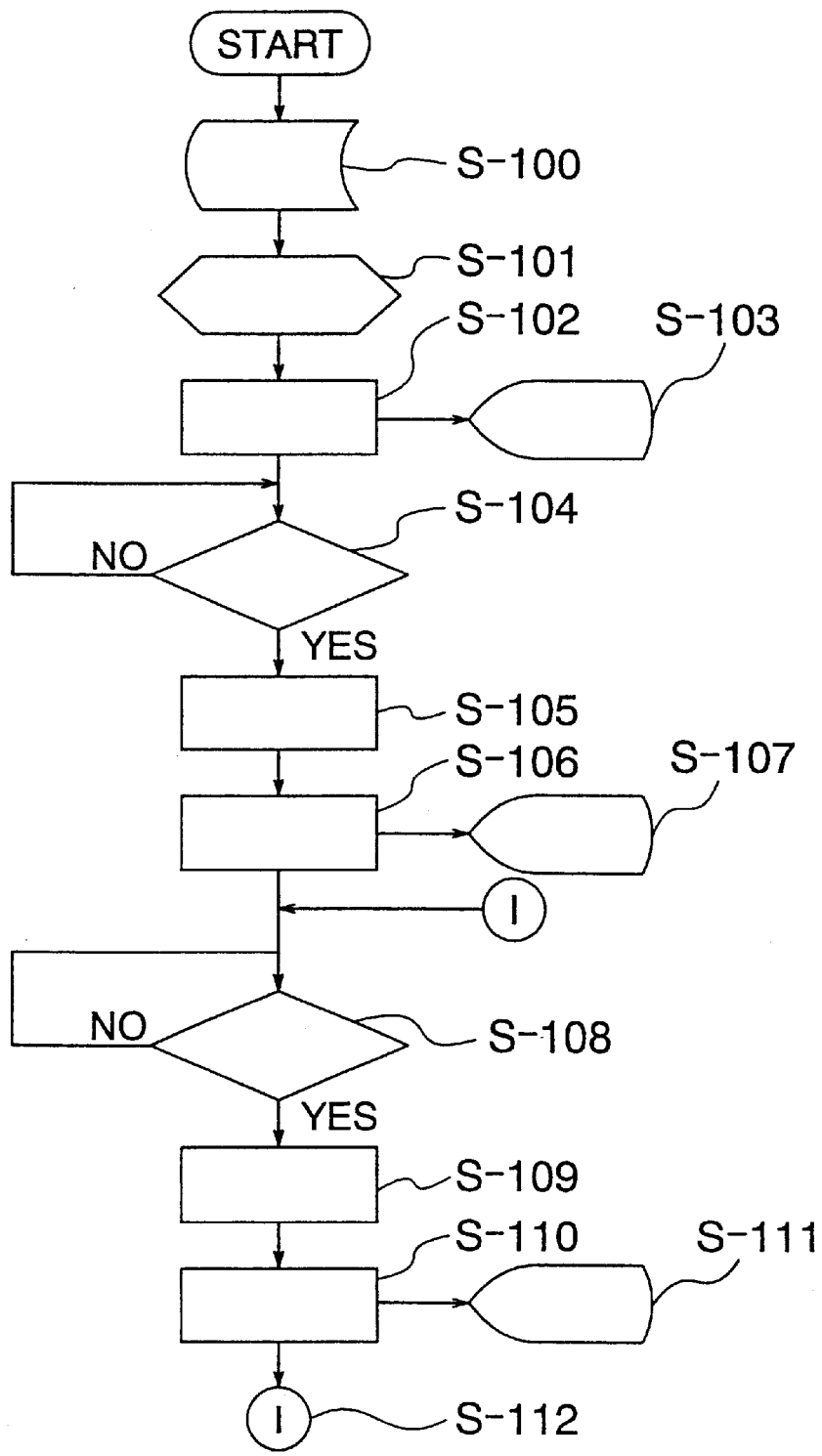
FIG. 11 is a flow chart showing an operating principle of a controlling device.
Figure 12:
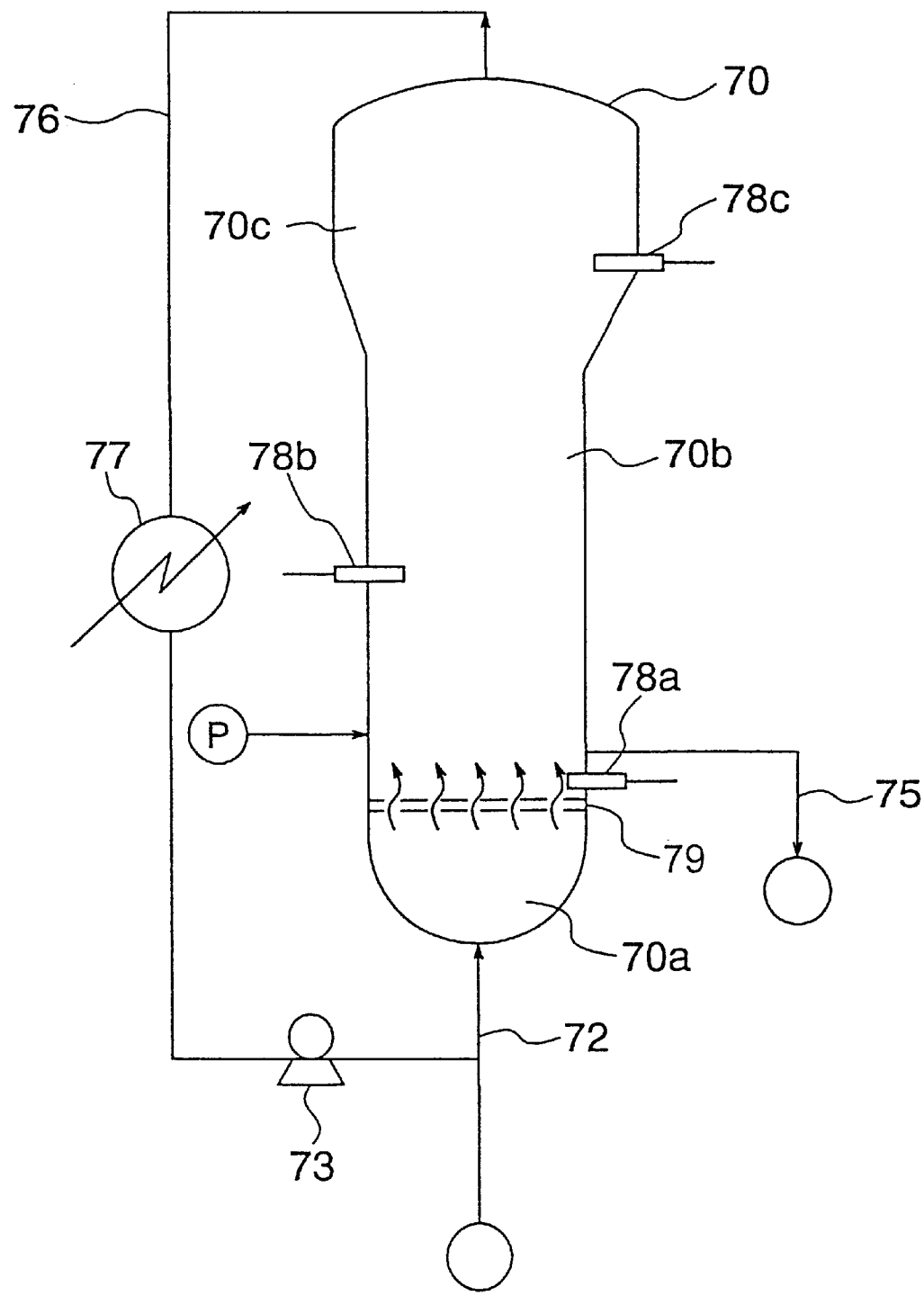
FIG. 12 is a front view of a conventional polymerizing apparatus.

Next, control action principle found in the PC 3 will be explained in reference to a flow chart of FIG. 11. At first, data regarding the polymerization vessel 1 to be controlled (for example, pressure value, flow speed value or flow rate value) are retrieved (step S100). Then, The target value concerning temperature distribution corresponding to the retrieved data are read (step S101). Afterward, the temperature distribution of the polymerization vessel 1 measuring on real time is allowed to be shown on the display screen 81 of a display unit 80, at the same time, comparison and operation between the measured temperature distribution and the target value thereof are made (step S102). In this process, the measured temperature is recorded on real time (step S103).

Then, it is judged whether the resultant difference between the measured temperature distribution and the target value is allowable or not (step S104). When the difference is allowable, polymerization is performed on the present operational conditions. In this contrast, when the difference is not allowable, predetermined control signal is output (step S105), and then the operational conditions are changed on the basis of a control map. After changing the operational conditions temperature distribution of the polymerization vessel are allowed to be recorded, at the same time, comparison and operation between the measured temperature distribution and the target value thereof are made again (step S106). In this process, temperature distribution after changing operational conditions is recorded on real time (step S107).

Then, it is judged whether the resultant difference between the measured temperature distribution and the target value is allowable or not (step S108). When the difference is allowable, polymerization is performed on the present operational conditions. In this contrast, when the difference is not allowable, predetermined control signal is output (step S109), and then the operational conditions are changed on the basis of a control map. After changing again the operational conditions temperature distribution of the polymerization vessel are allowed to be recorded, at the same time, comparison and operation between the measured temperature distribution and the target value thereof are made again (step S110). In this process, temperature distribution after changing operational conditions is recorded on real time (step S111).

Change of the operational conditions is repeated until the measured temperature value agrees with the target value (step S112).

EFFECT OF THE INVENTION

As is evident from the above explanation, according to the present invention, temperature or temperature distribution of the external wall surface of the fluidized bed polymerization vessel can be measured closely, without adhering polymer particles to the temperature measuring device, as well as the polymerization state inside the fluidized bed polymerization vessel can be predicted with higher accuracy on the basis of the measurement.

Further, temperature or temperature distribution on part or all of the external wall surface of the polymerization vessel can be measured by the selection of a temperature measuring device, and depending on this result, polymerization state can be predicted with high accuracy and communicated to a control means.

Moreover, by comparison and calculation between the ideal target value and the measured value, operational conditions, thereby, polymerization conditions, for example, feed or influent speed of a catalyst, can be changed depending on the result of the calculation to perform stable polymerization state for a long period of time.

It is to be understood by those skilled in the art that the foregoing description is a preferred embodiment of the disclosed apparatus and process, and that various changes and modification may be made in the invention without departing from the spirit and scope thereof.

What is claimed is:

1. In a fluidized bed polymerization process wherein an olefin is polymerized under polymerization conditions,
   the improvement comprising polymerizing said olefin and a solid catalyst in a fluidized bed polymerization vessel having a fluidized bed for polymerization of said olefin, whereby said bed is fluidized by an olefin-containing fluid gas introduced into said polymerization vessel;
   recovering a gas containing unreacted olefins from the top of said fluidized bed polymerization vessel, and recycling said gas containing unreacted olefins to said polymerization vessel, and controlling the velocity at which said unreacted olefins are recycled;
   feeding fresh olefin-containing gas to said fluidized bed polymerization vessel;

feeding solid catalyst into said fluidized bed polymerization vessel;

monitoring the temperature or temperature distribution of said fluidized bed in said polymerization vessel by means of temperature measuring devices installed on the external wall surface of said fluidized bed polymerization vessel and arranged at plural different positions away from each other longitudinally and laterally, wherein at least one of the temperature measuring devices is installed on the external wall surface of said fluidizing bed polymerization vessel and formed on the polymerization vessel to produce no protrusion on the inner wall surface of the vessel;

comparing the measured values of temperature or temperature distribution with a target value of temperature or temperature distribution, and modifying the conditions of polymerization to obtain a measured value of temperature or temperature distribution that at least substantially corresponds to said target value in response to said comparison.

2. The process of claim 1, wherein said temperature or temperature distribution is measured at plural different positions on the external wall surface of said polymerization vessel by means of thermo-detectors installed on the same surface at plural different positions.

3. The process of claim 1, wherein said temperature or temperature distribution is measured at plural different positions on the external wall surface of said polymerization vessel by means of infrared temperature measuring devices.

4. The process of claim 1, wherein the height of the fluidized bed in the vessel is modified by changing the amount of the olefin polymer discharged from the vessel in response to said comparison of said measured values of temperature or temperature distribution.

5. The process of claim 1, wherein said temperature or temperature distribution is monitored at a partial section of the external wall surface.

6. The process of claim 3, wherein said infrared temperature measuring devices comprise a driving mechanism which travels on a ringed guide rail arranged around said fluidized bed polymerization vessel.

7. The process of claim 3, wherein said infrared temperature measuring devices comprise at least one of angle-variable means for fixing an angle variable in all directions, and means for enlarging or reducing a measurable area of temperature distribution of the external wall surface of said fluidized bed polymerization vessel.

* * * * *